(12) United States Patent
Kasahara

(10) Patent No.: US 11,761,759 B2
(45) Date of Patent: Sep. 19, 2023

(54) PROBE UNIT CORRECTION METHOD

(71) Applicant: MITUTOYO CORPORATION, Kawasaki (JP)

(72) Inventor: Kohju Kasahara, Tochigi (JP)

(73) Assignee: MITUTOYO CORPORATION, Kawasaki (JP)

( * ) Notice: Subject to any disclaimer, the term of this patent is extended or adjusted under 35 U.S.C. 154(b) by 0 days.

(21) Appl. No.: 17/831,975

(22) Filed: Jun. 3, 2022

(65) Prior Publication Data
US 2022/0390227 A1    Dec. 8, 2022

(30) Foreign Application Priority Data
Jun. 4, 2021    (JP) .............................. 2021-094809

(51) Int. Cl.
G01B 5/008    (2006.01)
G01B 21/04    (2006.01)
G01B 5/00    (2006.01)

(52) U.S. Cl.
CPC .......... *G01B 21/045* (2013.01); *G01B 5/008* (2013.01); *G01B 5/0014* (2013.01); *G01B 21/042* (2013.01); *G01B 21/047* (2013.01)

(58) Field of Classification Search
CPC ............................. G01B 21/042; G01B 21/045
USPC ........................................................ 33/503
See application file for complete search history.

(56) References Cited

U.S. PATENT DOCUMENTS

| | | | | |
|---|---|---|---|---|
| 4,958,438 A | * | 9/1990 | Hemmelgarn | G01B 5/0004 33/503 |
| 8,290,733 B2 | * | 10/2012 | Pettersson | G01B 21/042 73/1.01 |
| 9,989,347 B2 | * | 6/2018 | Jonas | G01B 21/045 |
| 2015/0051862 A1 | * | 2/2015 | Jonas | G01B 21/045 702/97 |

FOREIGN PATENT DOCUMENTS

| | | |
|---|---|---|
| JP | 3784273 | 6/2006 |
| JP | 2007-183184 | 7/2007 |
| JP | 4695374 | 6/2011 |
| JP | 5274782 | 8/2013 |
| JP | 6030339 | 11/2016 |
| JP | 6063161 | 1/2017 |
| JP | 6173628 | 8/2017 |

* cited by examiner

*Primary Examiner* — George B Bennett
(74) *Attorney, Agent, or Firm* — Greenblum & Bernstein, P.L.C.

(57) ABSTRACT

There is provided a probe unit correction method for correcting linear expansion of a probe unit to obtain an accurate measurement value. First, a probe offset value is calculated as a model. Then, a probe unit correction method includes a temperature data acquisition step of acquiring a temperature difference between a temperature at a time of calibration and a temperature of a current measurement environment, a reference tip coordinate correction step of calculating, as a reference tip correction coordinate value, a correction value of a reference tip coordinate value to which linear expansion is added, and a probe offset correction step of calculating, as a probe offset correction value, a correction value of a probe offset value to which the linear expansion is added.

2 Claims, 14 Drawing Sheets

| ORIENTATION OF LEG SHAFT (SECOND TIP) [I,J,K] | $\beta_1$ | $\beta_2$ |
|---|---|---|
| [0,0,0,] | 0 | — |
| [0,−1,0,] | 90 | 0 |
| [1,0,0,] | 90 | 90 |
| [0,1,0,] | 90 | 180 |
| [−1,0,0,] | 90 | −90 |

Fig. 10

PROBE UNIT CORRECTION METHOD

INCORPORATION BY REFERENCE

This application is based upon and claims the benefit of priority from JP patent application No. 2021-094809, filed on Jun. 4, 2021 (DAS code: 6E57), the disclosure of which is incorporated herein in its entirety by reference.

BACKGROUND OF THE INVENTION

Field of the Invention

The present invention relates to a control method of a shape measuring apparatus and particularly to a probe unit correction method for correcting linear expansion of a probe unit to obtain an accurate measurement value even if the measurement environment temperature fluctuates.

Description of Related Art

Shape measuring apparatuses with probes are widely used to detect the surface of an object to be measured (workpiece). In recent years, as the shapes of workpieces have become complicated, a shape measuring apparatus measures the surface of a complicated workpiece by exchanging multiple probes (styli) or changing the posture of a probe with a rotary drive axis.

For example, U.S. Pat. Nos. 3,784,273, 4,695,374, Japanese published unexamined patent application No. 2007-183184 and U.S. Pat. No. 6,173,628 can be listed as related technical documents.

SUMMARY OF THE INVENTION

Using multiple probes (styli) or changing the posture of a probe by the probe's own rotary drive axis enables efficient measurement of complicated workpieces, but that requires and increases the time and effort to calibrate multiple types of probes (styli) and a probe in various alteration forms of the probe as needed.

If the number of probe (stylus) types increases, or if a probe that variously changes its posture is used, frequent calibration of all the probes or the probe in all the alteration forms results in inefficient measurement. Meanwhile, if the measurement environment fluctuates, measurement errors that cannot be ignored occur unless calibration work is performed as needed.

In view of the above, a purpose of the present invention is to provide a control method of a shape measuring apparatus and particularly to a probe unit correction method for correcting linear expansion of a probe unit to obtain an accurate measurement value even if the measurement environment temperature fluctuates.

A correction method of a probe unit according to an exemplary embodiment of the present invention is a correction method of a probe unit that detects a surface of an object to be measured with a measuring tip at a tip end,
the probe unit including:
  a first tip being a measuring tip in a standard form set as an initial standard specification; and
  a second tip being a measuring tip in an alteration form changed from the standard form, in which
  the first tip and the second tip are exchangeable,
  the first tip and the second tip are calibrated, when the probe unit is calibrated, to acquire a coordinate value of the first tip as a reference tip coordinate value and acquire an offset value from the first tip to the second tip as a probe offset value, and
  the probe offset value is added to the reference tip coordinate value to acquire a measurement value when the second tip is used,
  the correction method of the probe unit including:
  a temperature data acquisition step of acquiring a temperature difference between a temperature at a time of the calibration and a temperature of a current measurement environment;
  a reference tip coordinate correction step of calculating, as a reference tip correction coordinate value, a correction value of the reference tip coordinate value to which linear expansion is added;
  a probe offset correction step of calculating, as a probe offset correction value, a correction value of the probe offset value to which the linear expansion is added; and
  a measurement value calculation step of obtaining a corrected measurement value when the second tip is used in the current measurement environment by adding the probe offset correction value to the reference tip correction coordinate value.

BRIEF DESCRIPTION OF THE DRAWINGS

FIG. 10 is a diagram showing an example of the relation between an orientation of a leg shaft and an angle parameter;

DETAILED DESCRIPTION

Figure 1:
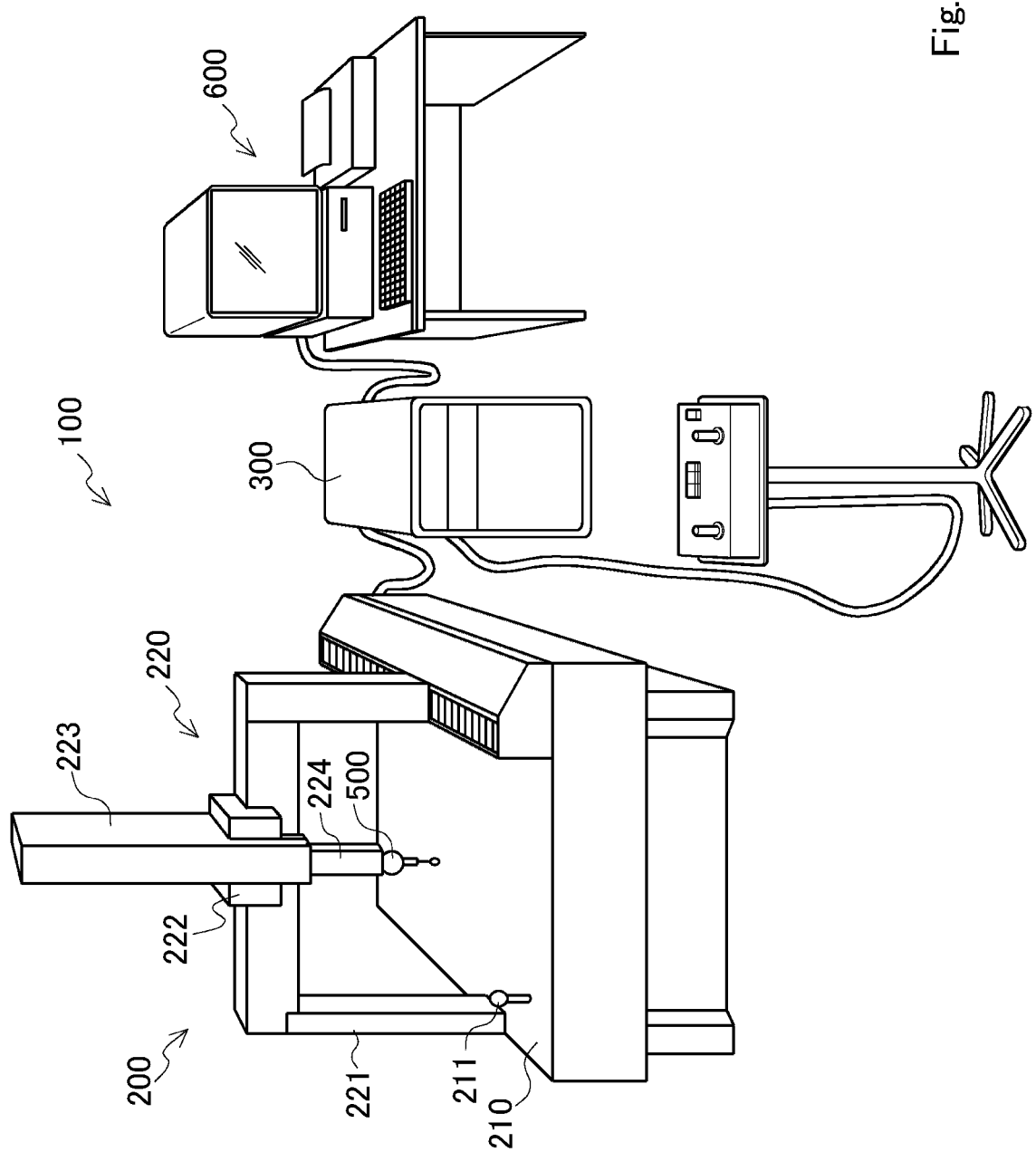
FIG. 1 is a diagram showing an overall configuration of a shape measuring system.

An embodiment of the present invention will be illustrated and described with reference to the reference signs assigned to the elements in the drawings.

First Exemplary Embodiment

FIG. 1 shows an overall configuration of a shape measuring system 100.

The configuration itself of the shape measuring system 100 is known, but will be briefly described.

The shape measuring system 100 includes a coordinate measuring machine 200, a motion controller 300 that controls the drive of the coordinate measuring machine 200, and a host computer 600 that controls the motion controller 300 and performs necessary data processing.

The coordinate measuring machine 200 includes a surface plate 210, a moving mechanism 220, and a probe unit 500.

The moving mechanism 220 includes a gate-type Y slider 221, an X slider 222, a Z-axis column 223, and a Z spindle 224. The Y slider 221 is provided slidably on the surface plate 210 in a Y direction. The X slider 222 slides along a beam of the Y slider 221 in an X direction. The Z-axis column 223 is secured to the X slider 222. The Z spindle 224 moves up and down inside the Z-axis column 223 in a Z direction.

The Y slider 221, the X slider 222, and the Z spindle 224 are each equipped with a driving motor (not shown) and an encoder (not shown).

Each driving motor is driven and controlled by drive control signals from the motion controller 300.

Each encoder detects a moving amount of the corresponding Y slider 221, X slider 222, or Z spindle 224 and outputs the detected value to motion controller 300.

A scale coordinate system (Xs, Ys, Zs) is set for the coordinate measuring machine 200.

Figure 2:
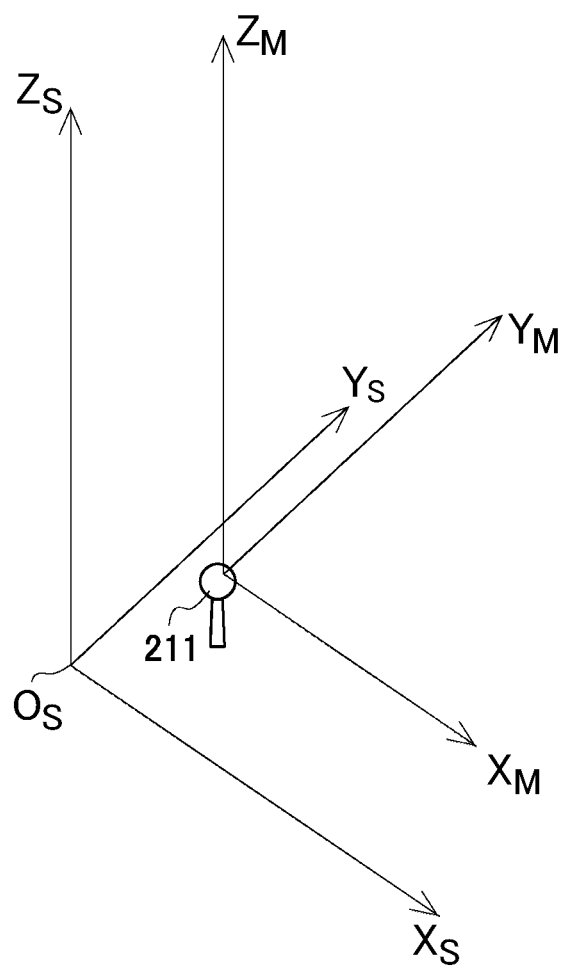
FIG. 2 is an example of the relation between coordinate systems.

FIG. 2 is a diagram showing the relation between coordinate systems.

The scale coordinate system includes an Xs axis, a Ys axis, and a Zs axis that are orthogonal to each other.

The Zs axis is an upward vertical direction.

An origin point Os of the scale coordinate system is determined by the origin point of the scale of the encoder provided along the Xs axis, the origin point of the scale of the encoder provided along the Ys axis, and the origin point of the scale of the encoder provided along the Zs axis.

In addition, a master gauge 211 (master ball) is installed at a predetermined position on the surface plate 210.

The master gauge 211 is used to perform calibration and set a machine coordinate system (XM, YM, ZM). The master gauge 211 is a steel ball, a ceramic ball, or the like. The diameter (radius) of the master gauge 211 is known. That is, by measuring the coordinates of some points on the surface of the master gauge 211 with the probe, the center position of the master gauge 211 can be uniquely determined. At this time, the radius of the measuring tip and the length (shape) of the stylus are calibrated simultaneously.

The master gauge 211 is supported at the tip end of a pillar part having a known height from the top surface of the surface plate 210 in the Z-axis direction. The scale coordinate system (Xs, Ys, Zs) is translated in order for the center position of the master gauge 211 to be at an origin $O_M$, whereby a machine coordinate system $(X_M, Y_M, Z_M)$ is obtained.

Other coordinate systems to be also used are a probe coordinate system, which is the coordinate system of a probe sensor built in the probe unit 500, and a workpiece coordinate system (Xw, Yw, Zw), in which a predetermined point (for example, a vertex) on the surface of a workpiece is the origin and a predetermined surface of the workpiece is an XwYw plane. However, they are not directly related to the present invention and are omitted.

The probe unit 500 is attached to the lower end of the Z spindle 224.

Figure 3:
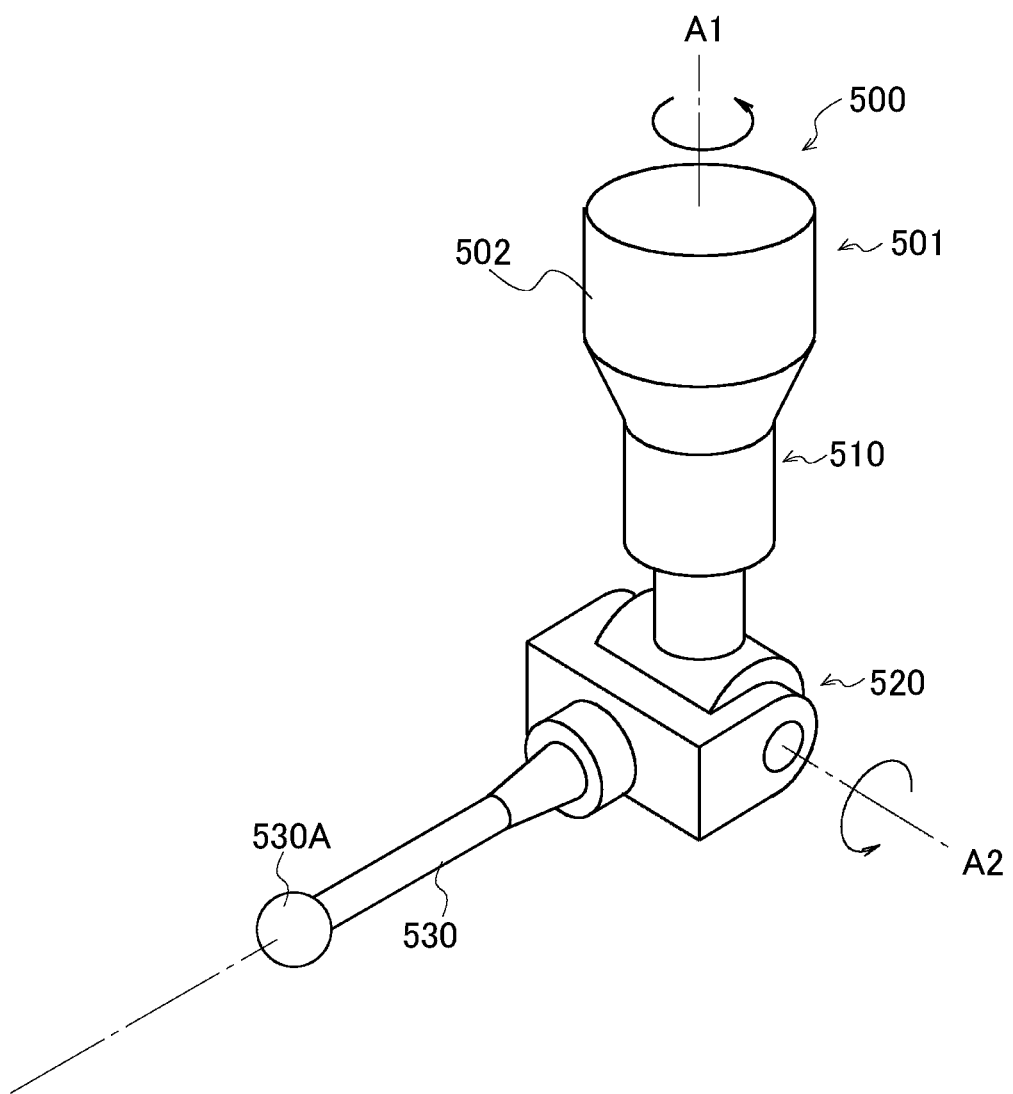
FIG. 3 is an external view of a probe unit.

FIG. 3 shows an external view of the probe unit 500.

Figure 4:
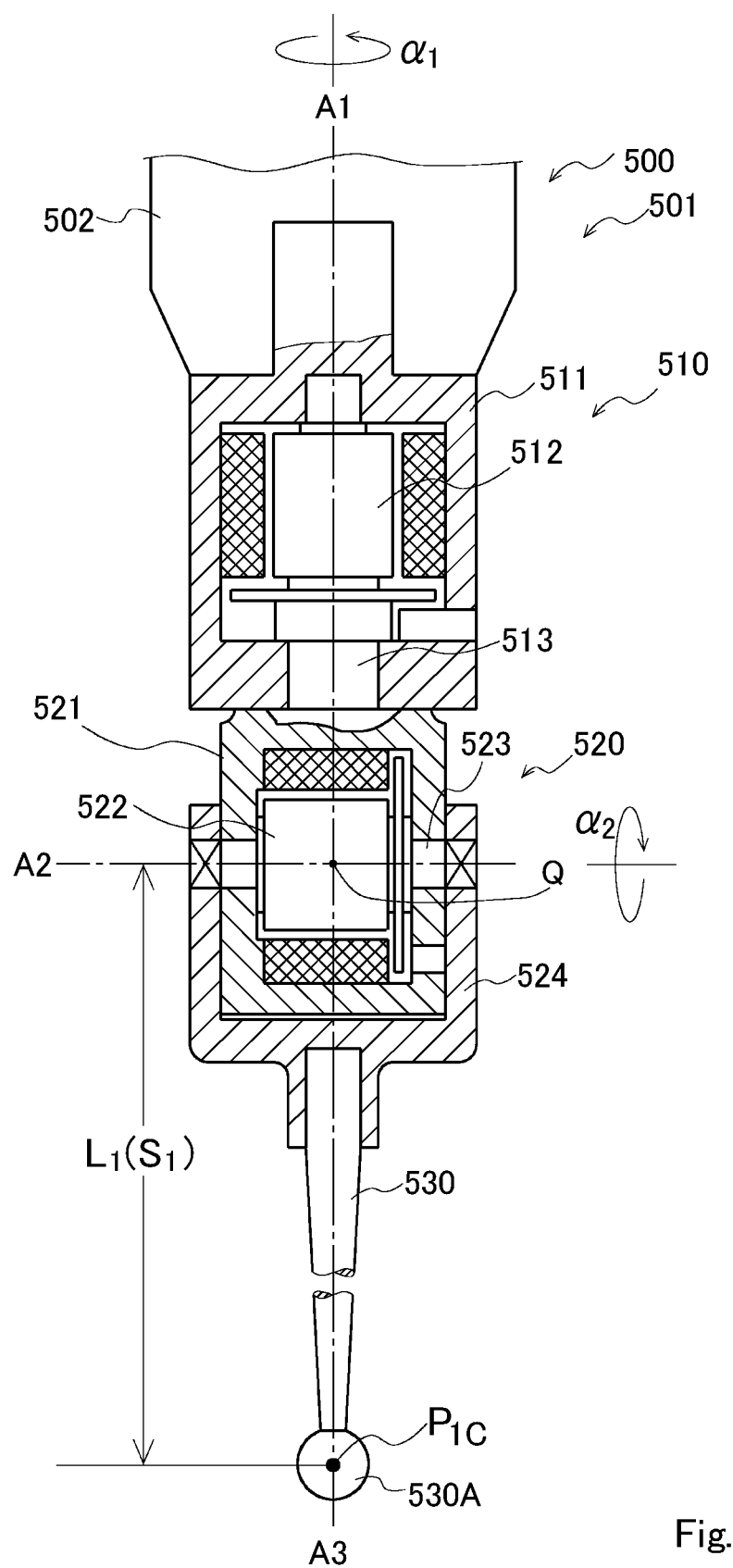
FIG. 4 is a cross-sectional view of the probe unit.

FIG. 4 shows a cross-sectional view of the probe unit 500.

The probe unit 500 includes a probe head main body 501 and a stylus (530) having a measuring tip (530A) at its tip end.

The probe head main body 501 includes a probe fixing part 502, a first rotation mechanism 510, and a second rotation mechanism 520.

The probe fixing part 502 is attached to the lower end of the Z spindle 224.

The first rotation mechanism 510 is provided at the lower end of the probe fixing part 502.

The first rotation mechanism 510 includes a first housing 511, a first motor 512, and a first shaft 513.

The first housing 511 is attached to the lower end of the probe fixing part 502. The first motor 512 is installed inside the first housing 511, and the first shaft 513 is attached to the armature of the first motor 512.

Here, the rotation axis of the first shaft 513 is referred to as a first rotation axis A1.

In the present exemplary embodiment, the axial direction of the first rotation axis A1 is parallel to the Z-axis direction.

The second rotation mechanism 520 includes a second housing 521, a second motor 522, a second shaft 523, and a U-shaped coupling frame 524.

The second housing 521 is coupled to the first shaft 513. The second motor 522 is installed inside the second housing 521, and the second shaft 523 is attached to the armature of the second motor 522.

Here, the rotation axis of the second shaft 523 is referred to as a second rotation axis A2.

The (extension line of the) first rotation axis A1 and the second rotation axis A2 are orthogonal to each other. The U-shaped coupling frame 524 is attached to the second shaft 523, and the U-shaped coupling frame 524 rotates around the second rotation axis A2.

The stylus (530) is attached to the lower end of the U-shaped coupling frame 524.

The stylus 530 attached to the probe unit 500 in FIGS. 3 and 4 is a straight linear stylus 530.

This straight stylus 530 is referred to as a reference stylus 530 used in the standard specification. The (extension line of the) axis A3 of the reference stylus 530 is orthogonal to the second rotation axis A2.

(Standard Form of Probe Unit 500)

The initial standard specification of the probe unit 500 assumes that the reference stylus 530 is attached to the probe unit 500 and that the axis A3 of the reference stylus 530 is parallel to the first rotation axis A1 (or that the axis A3 of the reference stylus 530 is aligned with the first rotation axis A1). This is a standard form of the probe unit 500.

In other words, in the standard form, the rotation of the second rotation axis A2 is zero, and the axis A3 of the reference stylus 530 and the first rotation axis A1 are parallel to the Z axis of the machine coordinate system.

The reference stylus 530 has a measuring tip 530A at its lower end.

The measuring tip is spherical and is brought into contact with an object to be measured. Here, the measuring tip 530A in the standard form is referred to as a first tip 530A.

The (extension line of the) first rotation axis A1, the second rotation axis A2, and the (extension line of the) axis A3 of the stylus 530 intersect at a single intersection.

For the sake of following explanation, this intersection is referred to as a rotation center Q.

The rotation angle of the first rotation axis A1 is represented by $\alpha_1$, where $-180° \leq \alpha_1 \leq 180°$. (There is no need to limit the range of motion as long as the electrical connection is established, and the rotational motion itself can be any number of rotations.) In FIG. 3 or 4, it is assumed that the front side is 0° and that the counterclockwise direction when viewed from the above is the rotation in the positive direction and the clockwise direction is the rotation in the negative direction.

The rotation angle of the second rotation axis A2 is represented by $\alpha_2$, where $0° \leq \alpha_2 \leq 90°$. It is assumed that the angle is 0° when the stylus 530 faces vertically downward.

The reference point of 0° is arbitrary.

The first motor 512 and the second motor 522 are, for example, stepping motors and are driven in synchronization with the applied drive pulses. The quantity of motion (rotation angle) of each of the first rotation mechanism 510 and the second rotation mechanism 520 is proportional to the number of drive pulses.

The probe unit 500 supports the stylus 530 in such a manner that the stylus 530 is movable within a certain range in the axial directions of the Xp, Yp, and Zp axes, which are the coordinate axes of the probe coordinate system, in order to detect contact between the measuring tip (530A) with the surface of a workpiece. The probe unit 500 further includes a probe sensor (not shown) that detects displacement of the stylus 530. The probe sensor outputs the detected value to the motion controller 300.

(Alteration Form of Probe Unit)

The probe unit 500 can be used in an alteration form, which is changed from the standard form, depending on an object to be measured.

In the alteration form of the probe unit 500, for example, the stylus remains the reference stylus 530 and is raised or rotationally swung by rotationally driving the first rotation mechanism 510 (A1) and second rotation mechanism 520 (A2) as needed. Since the position of the measuring tip at this time is shifted from the position of the measuring tip (first tip 530A) in the standard form, the measuring tip in the alteration form changed from the standard form is referred to as a second tip 550A.

In addition, the "second tip 550A" also applies when the stylus is replaced from the reference stylus 530 to an odd-shaped stylus.

The odd-shaped stylus can be, for example, a bent L-shaped or cross-shaped stylus or a straight stylus that is longer or shorter than the reference stylus 530.

Note that, a single stylus (multi-stylus) may have both the reference tip (first tip 530A) and the second tip 550A.

(Configuration of Motion Controller 300)

Figure 5:
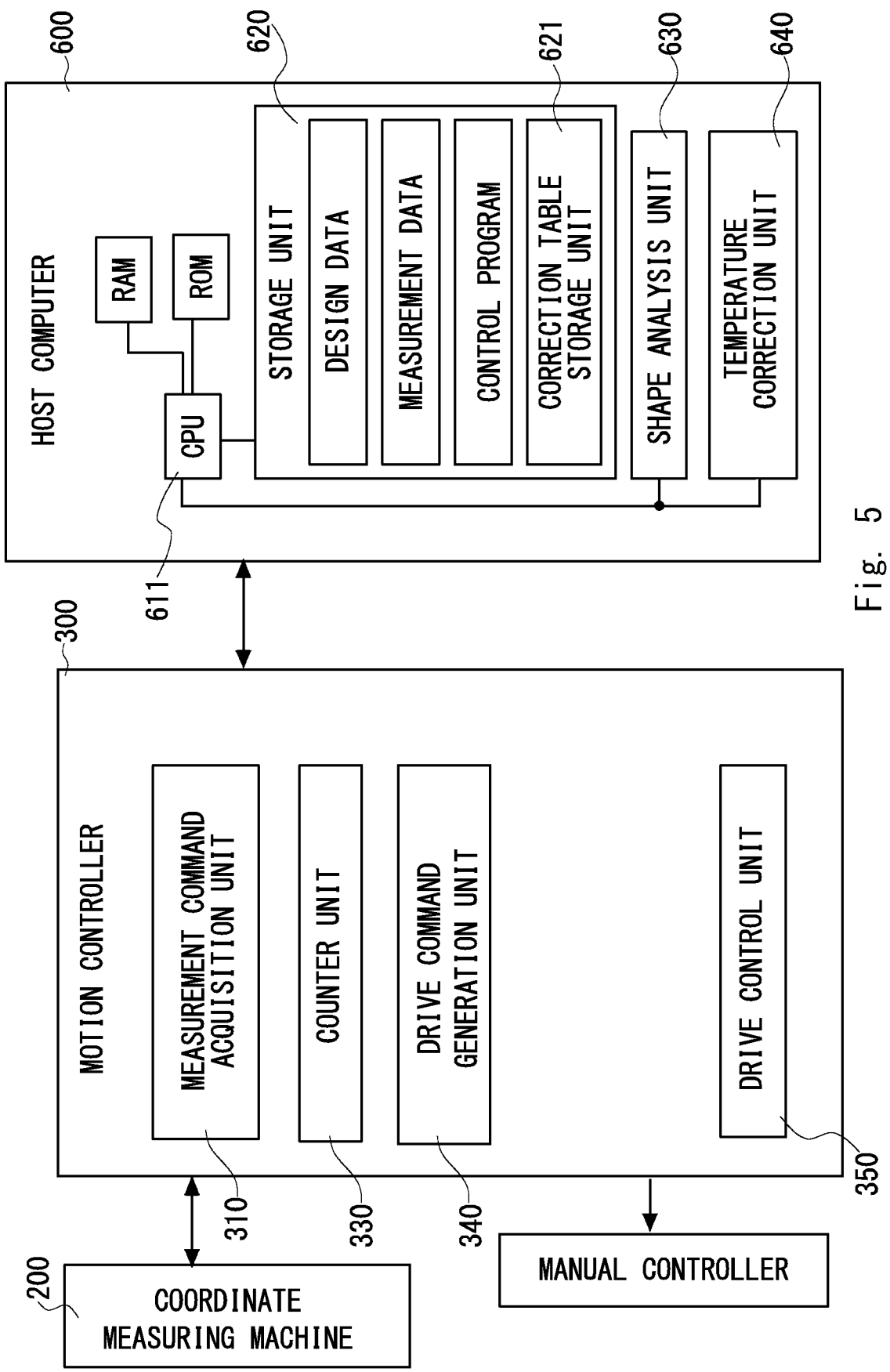
FIG. 5 is a functional block diagram of a motion controller and a host computer.

FIG. 5 shows a functional block diagram of the motion controller 300 and the host computer 600.

The motion controller 300 includes a measurement command acquisition unit 310, a counter unit 330, a drive command generation unit 340, and a drive control unit 350.

The measurement command acquisition unit 310 acquires measurement command data from the host computer 600.

The counter unit 330 counts detection signals output from the encoder to measure the displacement amount of each slider and counts detection signals output from the probe sensor to measure the displacement amount of the probe unit 500 (stylus). From the measured displacement amounts of the sliders 221, 222, and 224 and the probe unit 500, position information about the probe unit 500 or the measuring tip (550A) is obtained.

In addition, from the displacement of the stylus (550) measured by the counter unit 330 (the detected value (Px, Py, Pz) of the probe sensor), the indentation amount (or the indentation direction) of the measuring tip (550A) is obtained.

The drive command generation unit 340 generates a drive command to be provided to the moving mechanism 220 based on the measurement command data from the host computer 600. Velocity vector commands for driving and controlling the moving mechanism 220 are disclosed in, for example, JP 5274782 B, JP 6030339 B, JP 6063161 B, and the like.

(Configuration of Host Computer)

The host computer 600 includes a central processing unit (CPU) 611, a memory, and the like and controls the coordinate measuring machine 200 through the motion controller 300. The CPU 611 executes a control program to perform the operation in the present exemplary embodiment (temperature correction of the probe). The host computer 600 is connected with output devices, such as a display and a printer, and input devices, such as a keyboard and a mouse, as required.

The host computer 600 further includes a storage unit 620, a shape analysis unit 630, and a temperature correction unit 640.

The storage unit 620 stores design data (CAD data, NURBS data, and the like) related to the shape of an object to be measured (workpiece) W, measurement data obtained in measurement, and a control program for controlling the entire operation.

In the present exemplary embodiment, the storage unit 620 includes a correction table storage unit 621 that stores calibration data (correction table) for the probe unit 500.

Figure 6:
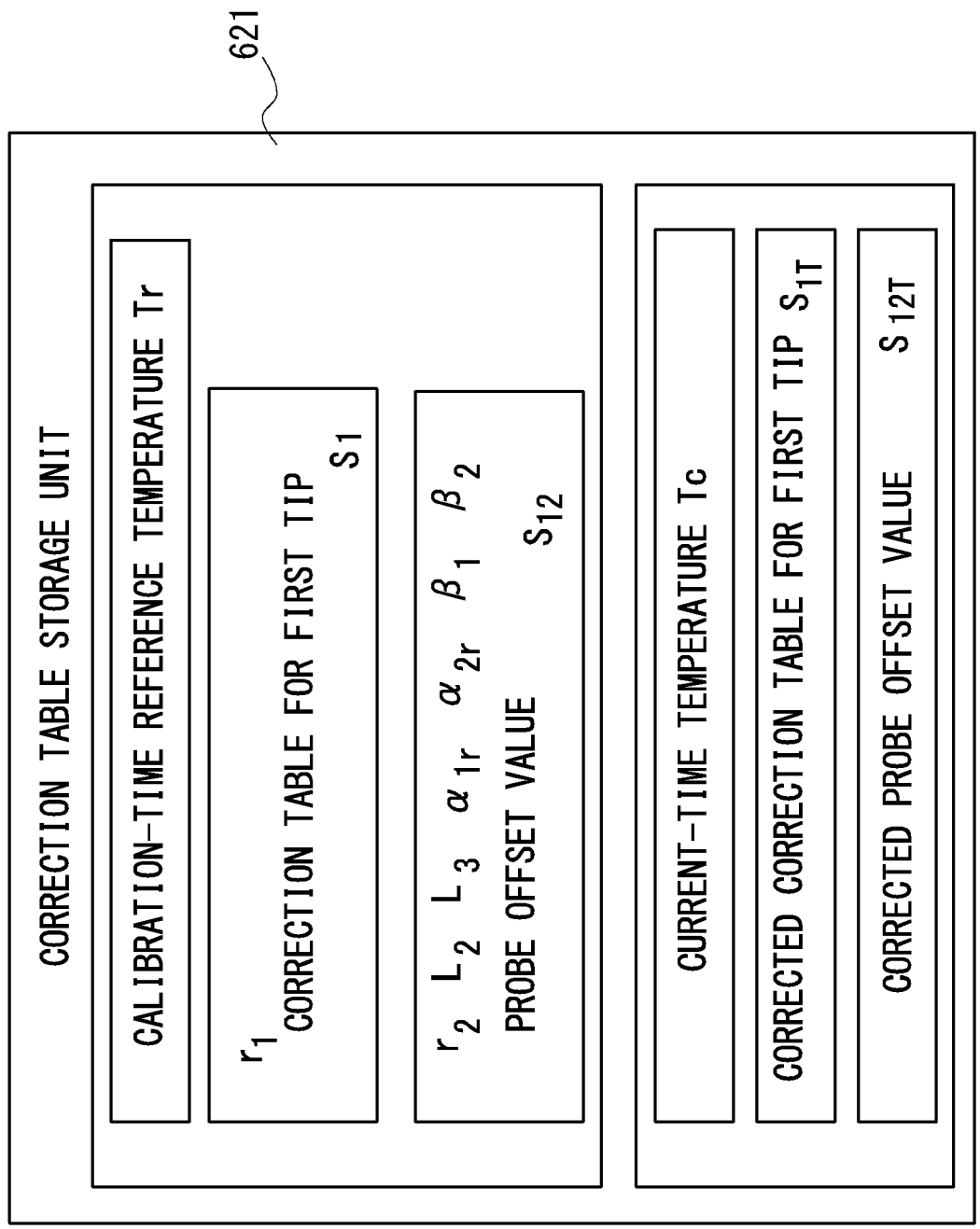
FIG. 6 is a diagram showing an example of data stored in a correction table storage unit.

The data stored in the correction table storage unit 621 is shown in FIG. 6. The calibration data (correction table) stored in the correction table storage unit 621 is described later.

The shape analysis unit 630 calculates surface shape data about the object to be measured based on the measurement data (sampling data) output from the motion controller 300 and analyses the shape to obtain the error, distortion, and the like of the calculated surface shape data about the object to be measured. The shape analysis unit 630 also generates measurement command data by converting the design data (CAD data, NURBS data, and the like) containing scanning path information into PCC curves, and the like.

The shape analysis unit 630 generates calibration data based on the measurement data when the master gauge 211 is measured with the measuring tip in the standard form and in the alteration form.

This point will be described later.

The temperature correction unit 640 calculates a correction value for the calibration data (correction table) according to a temperature difference ΔT between the time of calibration and the time of workpiece measurement.

This point will be described later.

(Generation of Correction Table)

First, in order to use the shape measuring system 100, it is necessary to perform calibration using the master gauge 211.

The arithmetic processing of obtaining calibration data from the measurement data of the master gauge 211 for calibration is performed, for example, by the shape analysis unit 630.

(Calibration in Standard Form (of First Tip 530A))

First, the first tip 530A is calibrated in the standard form of the probe unit 500.

This also calibrates the coordinate measuring machine 200 and the electrical systems (for example, the encoders) of the probe unit 500 (for example, the setting of the origin) as well as the shape of the reference stylus 530. The calibration values (correction table) for the shape of the reference stylus 530 are a distance $L_1$ (see FIG. 4) from the rotation center Q of the probe unit 500 to the center point of the first tip 530A and a radius $r_1$ of the first tip 530A (reference tip).

By the calibration of the first tip 530A, a correction table $S_1$ ($S_{1X}$, $S_{1Y}$, $S_{1Z}$) for calculating the center point of the first tip 530A is obtained.

Here, it is assumed that a center point coordinate value of the first tip 530A considering the calibration is represented by $P_{1c}$ ($P_{1cX}$, $P_{1cY}$, $P_{1cZ}$).

In addition, it is assumed that a machine scale reading is represented by $M(M_X, M_Y, M_Z)$.

The machine scale reading includes a reading of the encoder of the coordinate measuring machine 200 and a reading of the sensor of the probe unit 500, and the machine scale reading is assumed to indicate the coordinates of the rotation center Q of the probe unit 500.

The center point coordinate value $P_{1c}$ of the first tip 530A considering the calibration is expressed by the correction table $S_1$ as follows.

$$P_{1c}(P_{1cX},P_{1cY},P_{1cZ})=M(M_X,M_Y,M_Z)+S_1(S_{1X},S_{1Y},S_{1Z})$$

Since the shape of the reference stylus 530 is a straight line parallel to the Z axis, $S_{1X}=S_{1Y}=0$, and $S_{1Z}=L_1$.

$$P_{1c}(P_{1cX},P_{1cY},P_{1cZ})=M(M_X,M_Y,M_Z)+S_1(0,0,L_1)$$

Note that the surface of the workpiece (object to be measured) is shifted from the center point coordinate value Pic of the first tip 530A by a radius r in the approach direction, which is well known.

The radius $r_1$ of the first tip 530A and the correction table $S_1$ are stored in the correction table storage unit 621 as the correction table for the first tip 530A (FIG. 6).

In addition, an environmental temperature Tr at the time of calibration work is stored in the correction table storage unit 621 as a calibration-time reference temperature.

(Modeling of Probe Offset)

If the workpiece is also measured in an alteration form of the probe unit 500, calibration needs to be performed in the alteration form as well. That is, calibration work is performed for the probe unit 500 with the stylus (530 or 550) raised (swung) by a predetermined angle by driving the first rotation mechanism 510 and the second rotation mechanism 520 of the probe unit 500 or for the probe unit 500 with the replaced odd-shaped stylus (550).

For the purpose of explanation of the exemplary embodiment, the measuring tip in the alteration form is referred to as the second tip 550A.

Figure 7:
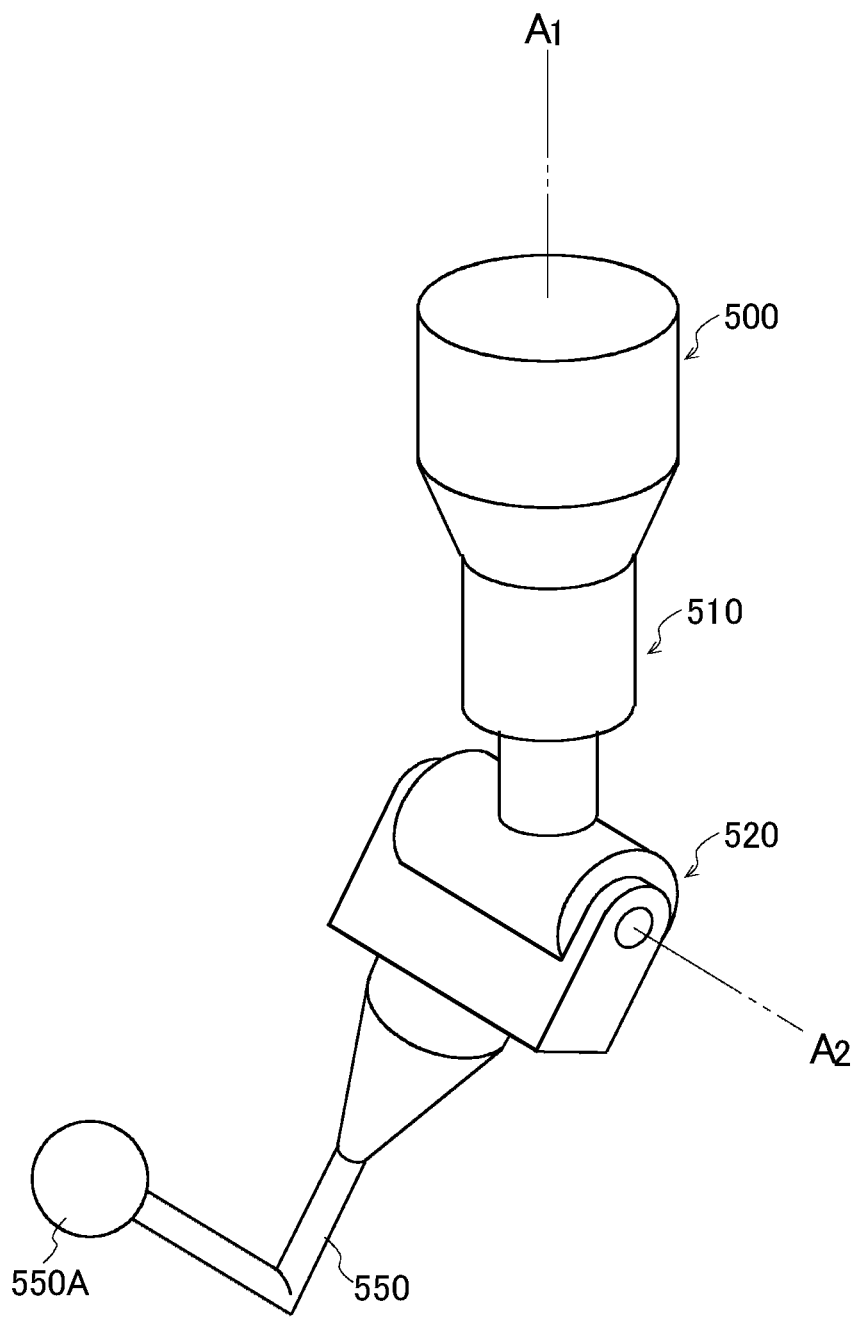
FIG. 7 is a diagram showing an alteration form of the probe unit.

As exemplified in FIG. 7, the second tip 550A is the measuring tip at the time when the reference stylus 530 is replaced with the bending stylus 550 and the first rotation mechanism 510 and the second rotation mechanism 520 are driven to raise and rotationally swing the stylus 550 by a predetermined angle.

Figure 11:
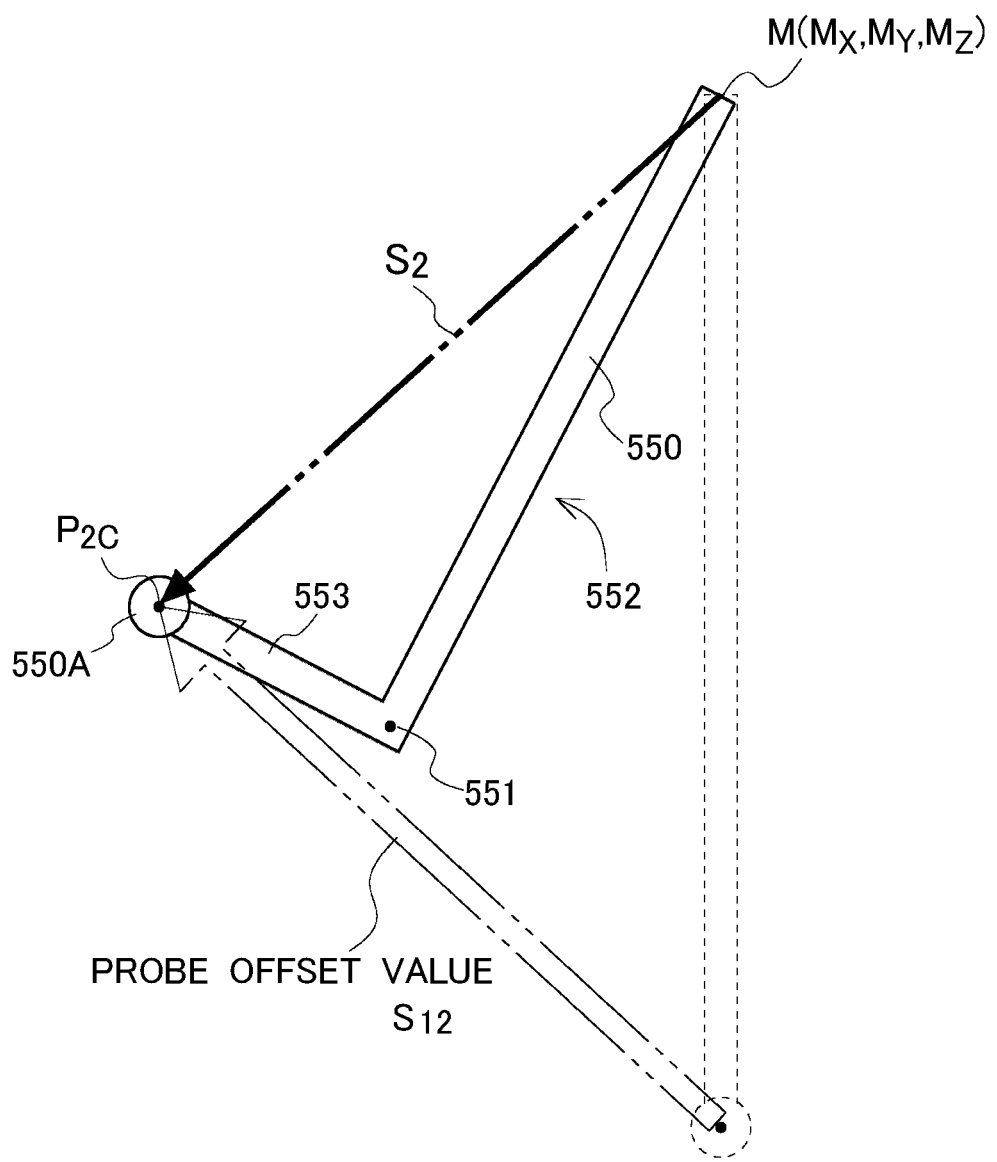
FIG. 11 is a diagram showing an example of a probe offset.

In the present exemplary embodiment, an offset value from the center of the first tip 530A to the center of the second tip 550A is obtained as the calibration data (correction table) for the second tip 550A (FIG. 11).

The offset value from the center of the first tip 530A to the center of the second tip 550A is referred to as a probe offset value $S_{12}$.

By modeling the components of the probe unit 500, the probe offset value can be expressed as follows.

Figure 8:
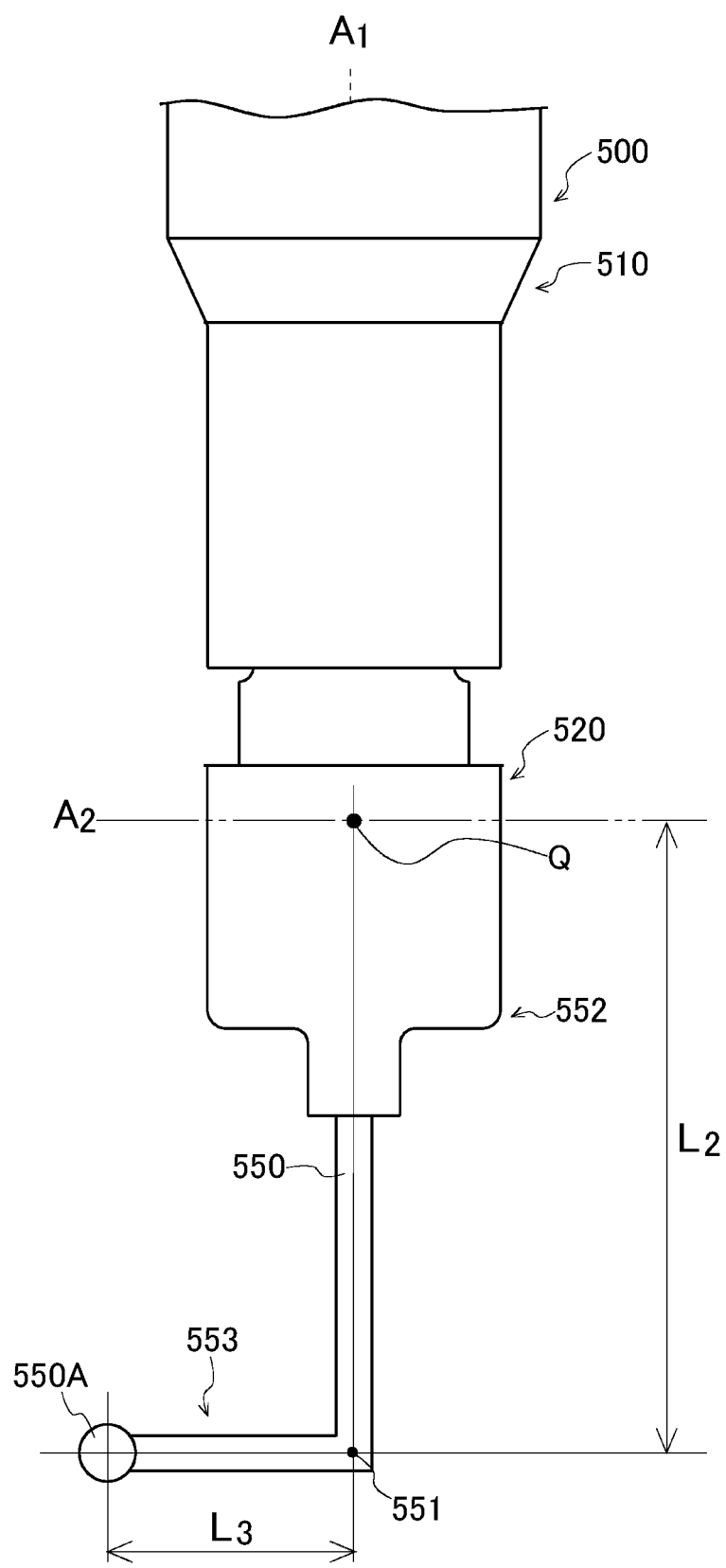
FIG. 8 is a diagram showing that a reference stylus is replaced with a bending stylus.

First, it is supposed that the reference stylus 530 is replaced with the bending stylus 550, as exemplified in FIG. 8.

Here, an L-shaped stylus bending at 90° is shown as an example of the bending stylus 550, but the angle of bending is not limited to 90°.

As the shape parameters of the bending stylus 550, a body shaft 552 is from the rotation center Q to a bending point 551, and the length of the body shaft 552 is represented by $L_2$.

In addition, a leg shaft 553 is from the bending point 551 to the center of the tip, and the length of the leg shaft 553 is represented by $L_3$.

Furthermore, the orientation of the leg shaft 553 and the quantity of the bending are expressed as angle parameters.

To express the bending of the leg shaft 553 of the bending stylus 550, an auxiliary coordinate system is introduced.

Figure 9:
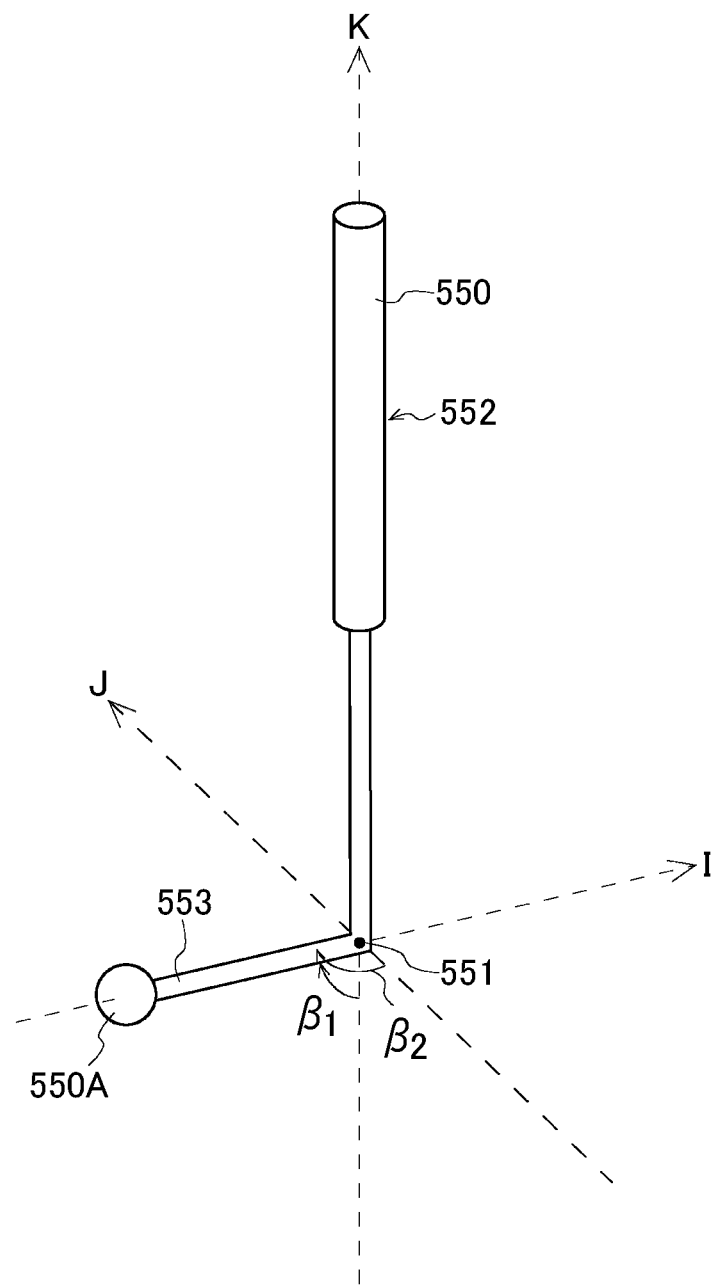
FIG. 9 is a diagram showing an auxiliary coordinate system.

FIG. 9 shows the auxiliary coordinate system.

The auxiliary coordinate system including an I axis, a J axis, and a K axis is introduced as a right-handed Cartesian coordinate system.

With the rotation of the first and second rotation mechanisms 510 and 520 of the probe head main body 501 set to zero, the origin of the auxiliary coordinate system is at the bending point 551 of the bending stylus 550, the K axis is parallel to the body shaft 552 of the bending stylus 550, and the I axis is parallel to the second rotation axis A2.

In this state, the angle formed by the leg shaft 553 and the K axis (in the negative direction of K axis) is represented by $\beta_1$.

Then, the angle formed by the leg shaft 553 and the KJ plane is represented by $\beta_2$.

It is assumed that the negative direction of the J axis is 0°, that the positive direction of the J axis is 180°, and that rightward rotation around the K axis is positive.

The above can be rephrased as follows.

First, the measuring tip of the straight stylus parallel to the K axis is rotated by $\beta_1$ around the I axis. Thereafter, the measuring tip is rotated by $\beta_2$ around the K axis. Then, the measuring tip (530A) of the reference stylus 530 overlaps (or is in the same direction as) the measuring tip (550A) of the bending stylus 550.

Note that, it is assumed that a chuck part that attaches the stylus (530, 550) to the probe head main body 501 has a mating, such as a key and keyway, a projection and notch, or a partially flat surface, that uniquely determines the mounting orientation of the stylus (530, 550) and that the orientation and the quantity of the bending of the leg shaft 553 of the bending stylus 550 are unique in the machine coordinate system.

For example, if the bending stylus 550 is an L-shaped stylus bending at 90° and the length of the leg shaft 553 is 1, the relation between the bending direction of the L-shaped stylus and the angles $\beta_1$ and $\beta_2$ is expressed in the table in FIG. 10.

Then, as exemplified in FIG. 7, the first and second rotation mechanisms 510 and 520 are rotated by the necessary angles to raise and swing the measurement tip (530A) to the position at which calibration is performed. The rotation angles of the first and second rotation mechanisms 510 and 520 in the alteration form in which calibration is performed are $\alpha_{1r}$, and $\alpha_{2r}$, respectively as reference angles. The measuring tip of the probe unit 500 in this state is the second tip 550A.

Now, using the parameters introduced so far, the offset value (probe offset value) $S_{12}$ from the center of the first tip 530A to the center of the second tip 550A can be expressed as follows.

$$S_{12}=(S_{12X},S_{12Y},S_{12Z})$$

Each element of the probe offset is expressed by the following expressions.

$$S_{12X} = -L_3 \cdot \cos(\alpha_{1r}) \cdot \sin(\beta_1) \cdot \sin(\beta_2) - \sin(\alpha_{1r})\{L_3 \cdot \cos(-\alpha_{2r}) \cdot \sin(\beta_1) \cdot \cos(\beta_2) + \sin(-\alpha_{2r})(L_3 \cdot \cos(\beta_1) + L_2)\}$$

$$S_{12Y} = -L_3 \cdot \sin(\alpha_{1r}) \cdot \sin(\beta_1) \cdot \sin(\beta_2) + \cos(\alpha_{1r})\{L_3 \cdot \cos(-\alpha_{2r}) \cdot \sin(\beta_1) \cdot \cos(\beta_2) + \sin(-\alpha_{2r})(L_3 \cdot \cos(\beta_1) + L_2)\}$$

$$S_{12Z} = L_3 \cdot \sin(\alpha_{1r}) \cdot \sin(\beta_1) \cos(\beta_2) - \cos(-\alpha_{2r})(L_3 \cdot \cos(\beta_1) + L_2) + L_1$$

In these expressions, the angle values $\alpha_{1r}$, $\alpha_{2r}$, $\beta_1$, and $\beta_2$ are known values. That is, $\alpha_{1r}$ and $\alpha_{2r}$ are the rotation angles of the first and second rotation mechanisms 510 and 520 of the probe head main body 501, crediting the values obtained by a sensor (for example, a rotary encoder). Alternatively, it is assumed that the first and second rotation mechanisms 510 and 520 of the probe head main body 501 have been separately calibrated.

The values $\beta_1$ and $\beta_2$ are specifications of the (bending) stylus. The reason for crediting the angles is that the angles are considered to be unaffected by temperature.

Meanwhile, $L_1$, $L_2$ and $L_3$ are obtained from calibration data. The value $L_1$ is obtained from the calibration value of the first tip 530A.

The values $L_2$ and $L_3$ will be described later.

The model expression for the probe offset value $S_{12}$ is stored in the temperature correction unit 640.

(Calibration in Alteration Form (of Second Tip 550A))

Now, the calibration data (correction table) for the second tip is obtained by measuring the master gauge 211 with the second tip 550A.

By the calibration of the second tip 550A, a correction table $S_2$ ($S_{2X}$, $S_{2Y}$, $S_{2Z}$) for the center point of the second tip 550A is obtained.

Here, it is assumed that a center point coordinate value of the second tip 550A considering the calibration is represented by $P_{2c}(P_{2cX}, P_{2cY}, P_{2cZ})$.

In addition, it is assumed that a machine scale reading is represented by $M(M_X, M_Y, M_Z)$.

The machine scale reading includes a reading of the encoder of the coordinate measuring machine 200 and a reading of the sensor of the probe unit 500, and the machine scale reading is assumed to indicate the coordinates of the rotation center Q of the probe unit 500.

The center point coordinate value $P_{2c}$ of the second tip 550A considering the calibration is expressed by the correction table $S_2$ as follows.

This relation is exemplified in FIG. 11.

$$P_{2c}(P_{2cX}, P_{2cY}, P_{2cZ}) = M(M_X, M_Y, M_Z) S_2(S_{2X}, S_{2Y}, S_{2Z})$$

Therefore, the offset value (probe offset value) $S_{12}$ from the center of the first tip 530A to the center of the second tip 550A is obtained as the difference between the correction table $S_2(S_{2X}, S_{2Y}, S_{2Z})$ for calculating the center point of the second tip 550A and the correction table $S_1(S_{1X}, S_{1Y}, S_{1Z})$ for calculating the center point of the first tip 530A.

In other words, the probe offset value $S_{12}$ can be expressed as follows.

$$S_{12}(S_{12X}, S_{12Y}, S_{12Z}) = S_2(S_{2X}, S_{2Y}, S_{2Z}) - S_1(S_{1X}, S_{1Y}, S_{1Z})$$

The probe offset value $S_{12}$ has been calculated as a model. Thus, by substituting it into $S_{12}(S_{12X}, S_{12Y}, S_{12Z})$ in the above model expression and solving the simultaneous equations, the calibration values of $L_2$ and $L_3$ are obtained.

The correction table storage unit 621 stores $L_2$, $L_3$ and the probe offset value $S_{12}$ at the time of calibration as the correction table for the second tip 550A.

The temperature at the time of calibration is also stored in the correction table storage unit 621, as mentioned earlier.

If there is no temperature correction described later, in order to obtain the center point of the second tip 550A when the object to be measured (workpiece) is measured with the second tip 550A, the shape analysis unit 630 adds the probe offset value $S_{12}$ to the center point of the first tip 530A.

$$P_{2c}(P_{2cX}, P_{2cY}, P_{2cZ}) = P_{1c}(P_{1cX}, P_{1cY}, P_{1cZ}) S_{12}(S_{12X}, S_{12Y}, S_{12Z})$$

Note that the center point coordinate value $P_{1c}$ of the first tip 530A is determined by the machine scale reading M and the correction table $S_1$, as mentioned earlier.

Furthermore, the position of the surface of the object to be measured is obtained by considering the approach direction and the tip diameter.

This is known, and the description thereof will be omitted.

(Temperature Correction)

If the measurement environment temperature is stable and the same during calibration work and actual workpiece measurement, there is no drift in measured values due to environmental temperature changes. However, if the measurement environment temperature fluctuates, temperature drift occurs.

The present exemplary embodiment aims to correct linear expansion of a probe (stylus), which has not been taken care of in the past, with the temperature correction unit 640.

Figure 13:
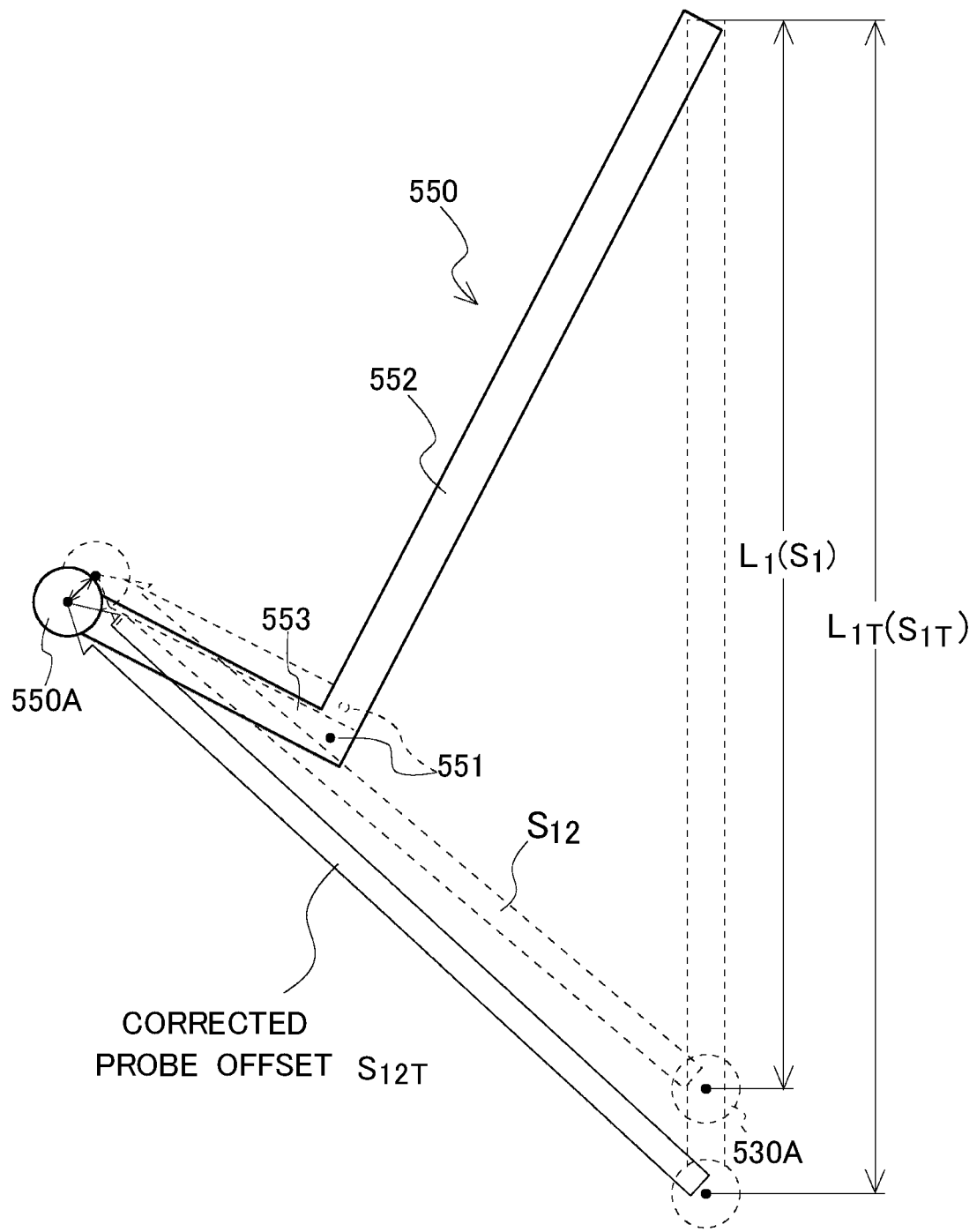
FIG. 13 is a diagram showing an example of the shift of a measuring tip (second tip) with an increase in the environmental temperature.
Figure 14:
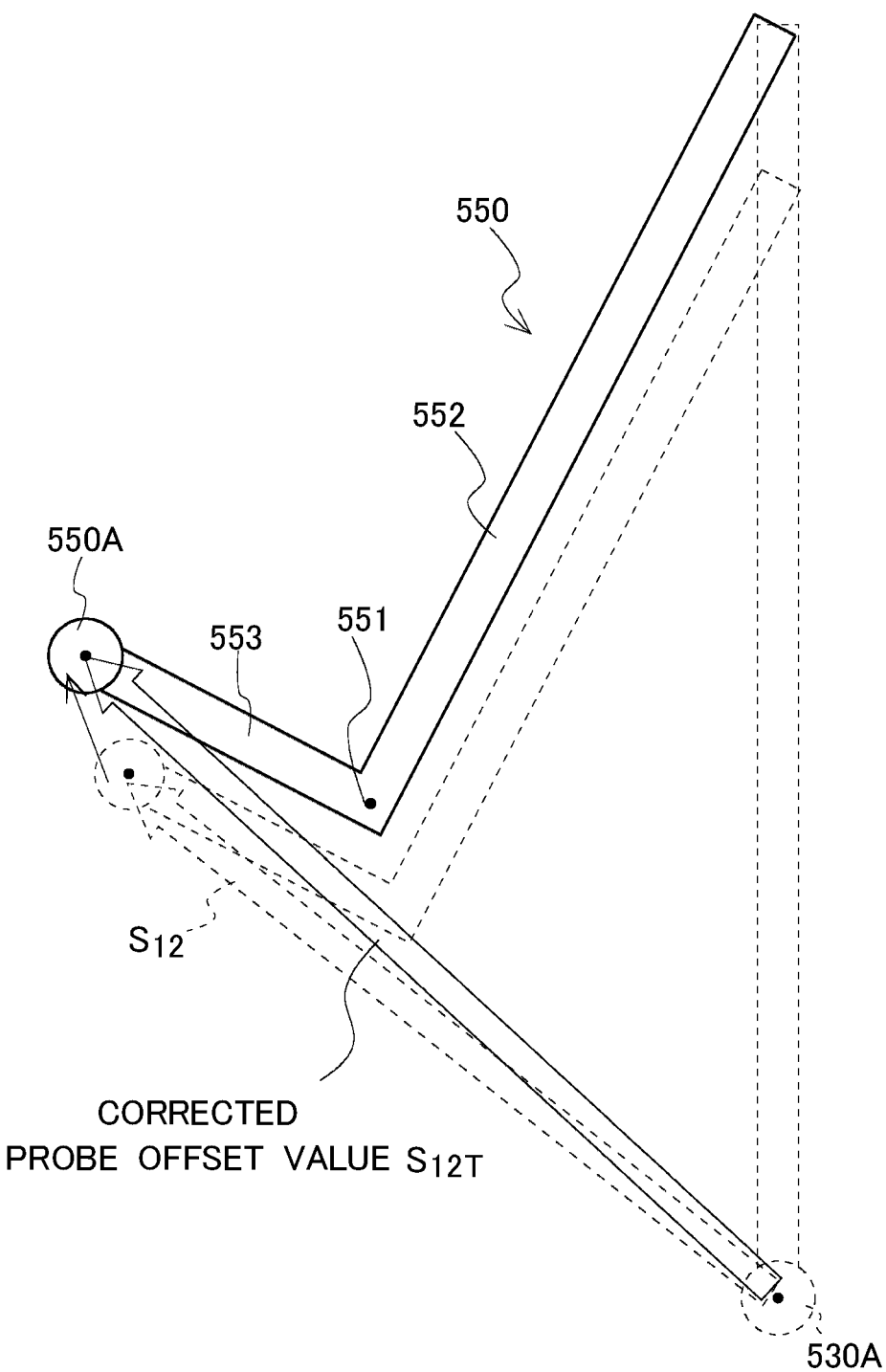
FIG. 14 is a diagram showing an example of a change in a probe offset with an increase in the environmental temperature.

For example, as exemplified in FIG. 13, if the body shaft 552 and leg shaft 553 of the bending stylus 550 are extended as the environmental temperature increases, the position of the measuring tip (second tip 550A) is shifted by that amount. In this case, if the position of the second tip 550A is to be obtained by adding the probe offset value $S_{12}$ from the first tip 530A, the correct position of the second tip 550A cannot be obtained because the probe offset value has changed. FIG. 14 exemplifies the probe offset variation by hypothetically superimposing the positions of the first tip 530A before and after linear expansion to be easily understood.

Figure 12:
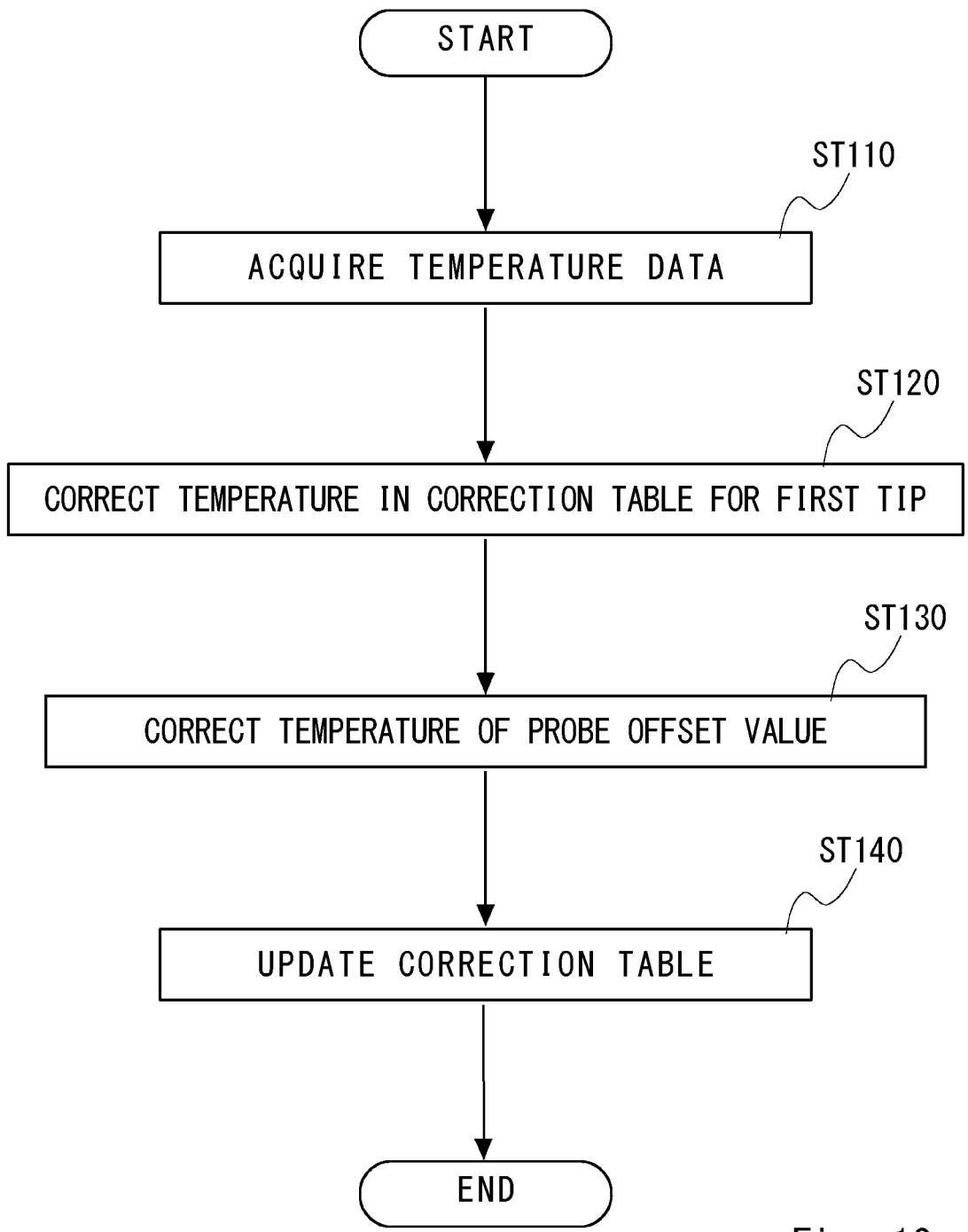
FIG. 12 is a flowchart showing a procedure of a temperature correction step.

FIG. 12 is a flowchart showing the procedure of a temperature correction step.

First, the temperature correction unit 640 acquires the measurement environment temperature (ST110). The coordinate measuring machine 200 may be equipped with a temperature sensor, or a temperature sensor in the measurement room may be used to obtain the temperature. The temperature correction unit 640 acquires the difference $\Delta T$ between the temperature at the time of calibration and the temperature of the current measurement environment as temperature data.

Then, the temperature correction unit 640 corrects the temperature in the correction table $S_1$ for the first tip (ST120).

Since the first tip 530A is attached to the tip end of the straight reference stylus 530, the temperature correction in the correction table $S_1$ for the first tip 530A is to add the expansion and contraction of the length $L_1$ of the reference stylus 530 caused by the linear expansion. It is assumed that a linear expansion coefficient is $k_1$, and that the length of the reference stylus 530 at the current temperature T is $L_{1T}$.

$$L_{1T} = L_1 + \Delta L_1 = L_1(1 + k_1 \Delta T)$$

$$S_{1T}(S_{1TX}, S_{1TY}, S_{1TZ}) = S_{1T}(0, 0, L_{1T})$$

The temperature correction unit 640 stores the correction table $S_{1T}$ for the first tip after the temperature correction in the correction table storage unit 621 together with the temperature data at the time of correction.

The temperature correction unit 640 further corrects the temperature of the probe offset value $S_{12}$ (ST130).

The probe offset value Su has been modeled, and a temperature-corrected probe offset value $S_{12T}$ is obtained by adding the linear expansion to $L_1$, $L_2$, and $L_3$.

It is assumed that a linear expansion coefficient of the bending stylus 550 is $k_2$, and that the lengths of the body shaft 552 and leg shaft 553 at the current temperature T are $L_{2T}$ and $L_{3T}$, respectively.

$$L_{2T}=L_2+\Delta L_2=L_2(1+k_2\Delta T)$$

$$L_{3T}=L_3+\Delta L_3=L_3(1+k_2\Delta T)$$

The temperature-corrected offset table $S_{12T}$ is obtained by substituting $L_{1T}$, $L_{2T}$, and $L_{3T}$ after temperature correction into the model.

Offset table Sur after temperature correction=$(S_{12TX}, S_{12TY}, S_{12TZ})$ $$S_{12TX}=-L_{3T}\cdot\text{Cos}(\alpha_{1r})\cdot\text{Sin}(\beta_1)\cdot\text{Sin}(\beta_2)-\text{Sin}(\alpha_{1r})$$
$$\{L_{3T}\cdot\text{Cos}(-\alpha_{2r})\cdot\text{Sin}(\beta_1)\cdot\text{Cos}(\beta_2)+\text{Sin}(-\alpha_{2r})$$
$$(L_{3T}\cdot\cos(\beta_1)+L_{2T})\}$$

$$S_{12TY}=-L_{3T}\cdot\text{Sin}(\alpha_{1r})\cdot\text{Sin}(\beta_1)\cdot\text{Sin}(\beta_2)+\text{Cos}(\alpha_{1r})$$
$$\{L_3\cdot\text{Cos}(-\alpha_{2r})\cdot\text{Sin}(\beta_1)\cdot\text{Cos}(\beta_2)+\text{Sin}(-\alpha_{2r})$$
$$(L_{3T}\cdot\text{Cos}(\beta_1)+L_{2T})\}$$

$$S_{12TZ}=L_{3T}\cdot\text{Sin}(\alpha_{1r})\cdot\text{Sin}(\beta_1)\cdot\text{Cos}(\beta_2)-\text{Cos}(-\alpha_{2r})$$
$$(L_{3T}\cdot\text{Cos}(\beta_1)+L_{2T})+L_{1T}$$

The temperature correction unit 640 stores the offset table Sur after the temperature correction in the correction table storage unit 621 together with the temperature data at the time of correction (ST140).

(Calculation of Corrected Measurement Value)

It is supposed that the measurement environment temperature has changed by $\Delta T$ from the temperature at the time of calibration to the temperature T.

When the shape of an object to be measured (workpiece) is measured with the bending stylus 550 in this temperature environment, the shape analysis unit 630 uses a temperature-corrected correction table to obtain a temperature-corrected measurement value.

The operation for obtaining the measurement value is performed by the shape analysis unit 630 as follows.

By adding the correction table $S_{1T}$ for the first tip to the machine scale reading $M(M_X, M_Y, M_Z)$, the temperature-corrected center coordinates of the first tip 530A are (virtually) obtained. Then, by adding the temperature-corrected offset table $S_{12T}$ to the center coordinates of the first tip 530A, the temperature-corrected center coordinates of the second tip 550A in the alteration form targeted for calibration is (virtually) obtained (see FIG. 13). Furthermore, since the rotation angles $\alpha_1$ and $\alpha_2$ of the first and second rotation mechanisms 510 and 520 are available as the sampling measurement values, the center of the measuring tip is currently at a position rotated by $(\alpha_1-\alpha_{1r})$, $(\alpha_2-\alpha_{2r})$ from the reference angles $\alpha_{1r}$ and $\alpha_{2r}$.

In addition, the surface of the workpiece (object to be measured) is at a position to which the approach direction and tip diameter are added.

Although the description above is for the correction for linear expansion of the probe unit 500, linear expansion of the encoder scale may be further added (subtracted) to obtain a measurement value corrected to the temperature at the time of calibration or to a determined specified temperature (for example, 20° C. or 25° C.).

According to the present exemplary embodiment described above, it is possible to correct linear expansion of a probe (stylus), which has not been taken care of in the past, and to obtain an accurate measurement values.

Furthermore, even if the measurement environment temperature changes, an accurate measurement value can be obtained by the temperature correction of the probe unit 500 in the present exemplary embodiment, and there is no need to frequently calibrate all probes (styli) or alteration forms. Thus, it is possible to considerably reduce the number of times of calibration.

Moreover, even if calibration work is performed, all probes and all alteration forms are not calibrated, but only the reference stylus 530 is regularly calibrated, and others (for example, the second tip) may be calibrated as needed.

The present invention is not limited to the above exemplary embodiment, but can be modified as needed without departing from the gist.

In the above exemplary embodiment, the two-axis probe unit 500 is exemplified, but the probe unit 500 itself is not necessarily required to have a rotary drive axis.

The invention is widely applicable to cases where measurement is performed with a measuring tip that has an offset from the first tip 530A of the reference stylus 530.

A (control) program that achieves temperature correction of a probe can be installed in a computer by directly inserting a recording medium (for example, a nonvolatile recording medium) containing the program into the computer, or by reading the information on the recording medium from a reading device externally attached to the computer. The program may be provided to the computer by communication lines, such as a LAN cable or a telephone line, or wirelessly to be installed.

100 Shape measuring system
200 Coordinate measuring machine
210 Surface plate
211 Master gauge
220 Moving mechanism
221 Y slider
222 X slider
223 Z-axis column
224 Z spindle
300 Motion controller
310 Measurement command acquisition unit
330 Counter
340 Drive command generation unit
350 Drive control unit
500 Probe unit
501 probe head main body
502 Probe fixing part
510 First rotation mechanism
511 First housing
512 First motor
513 First shaft
520 Second rotation mechanism
521 Second housing
522 Second motor
523 Second shaft
524 U-shaped coupling frame
530 Reference stylus
530A Measuring tip (First tip)
550 bending stylus
550 Stylus
550A Measuring tip (Second tip)
551 Bending point 552 Body shaft
553 Leg shaft
600 Host computer
611 CPU
620 Memory unit
621 Correction table storage unit
630 Shape analysis unit
640 Temperature correction unit

The invention claimed is:

1. A correction method of a probe unit configured to detect a surface of an object to be measured with a measuring tip at a tip end,
the probe unit comprising:
   a first tip being a measuring tip in a standard form set as an initial standard specification; and
   a second tip being a measuring tip in an alteration form changed from the standard form, wherein
the first tip and the second tip are exchangeable,
the first tip and the second tip are calibrated, when the probe unit is calibrated, to acquire a coordinate value of the first tip as a reference tip coordinate value and acquire an offset value from the first tip to the second tip as a probe offset value, and
the probe offset value is added to the reference tip coordinate value to acquire a measurement value when the second tip is used,
the correction method of the probe unit comprising:
a temperature data acquisition step of acquiring a temperature difference between a temperature at a time of the calibration and a temperature of a current measurement environment;
a reference tip coordinate correction step of calculating, as a reference tip correction coordinate value, a correction value of the reference tip coordinate value to which linear expansion is added;
a probe offset correction step of calculating, as a probe offset correction value, a correction value of the probe offset value to which the linear expansion is added; and
a measurement value calculation step of obtaining a corrected measurement value when the second tip is used in the current measurement environment by adding the probe offset correction value to the reference tip correction coordinate value.

2. A recording medium storing a program causing a computer to execute the correction method of the probe unit according to claim 1.

* * * * *